May 15, 1934.  C. L. LOW  1,958,517
MEANS AND METHOD OF ADVERTISING MERCHANDISE
Filed Dec. 23, 1932
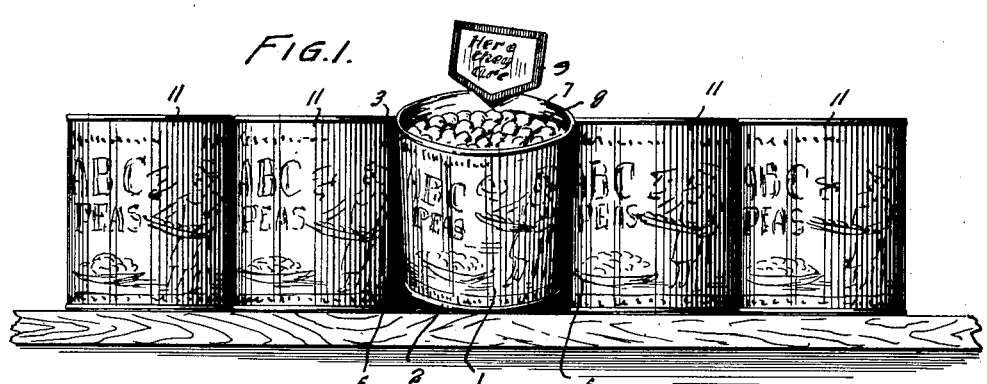
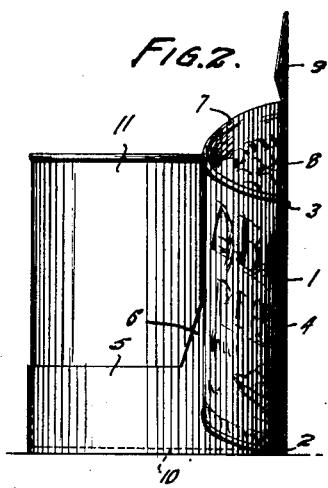
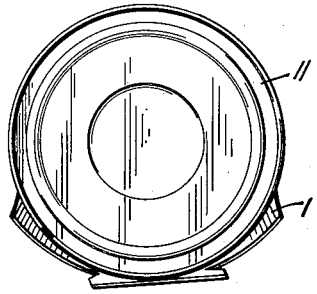
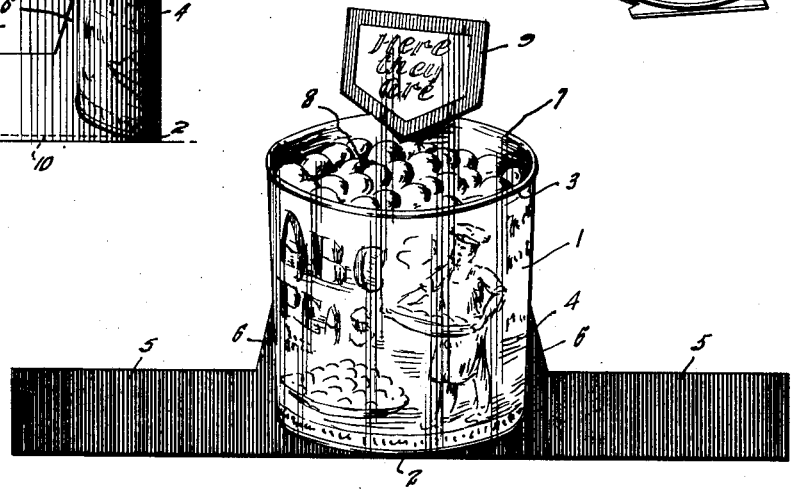
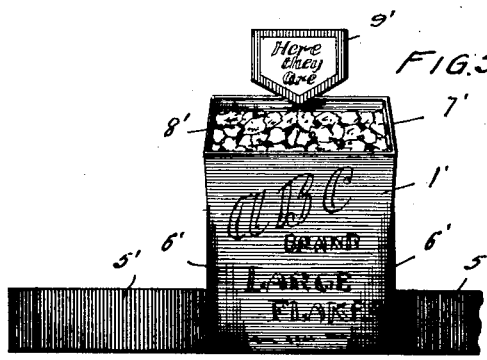
Inventor
CHARLES L. LOW Patented May 15, 1934

1,958,517

UNITED STATES PATENT OFFICE 1,958,517

MEANS AND METHOD OF ADVERTISING MERCHANDISE

Charles L. Low, Bloomington, Ill., assignor to Minnesota Valley Canning Company, Le Sueur, Minn., a corporation of Minnesota Application December 23, 1932, Serial No. 648,653

3 Claims. (Cl. 40—7)

This invention relates to advertising, and more particularly has reference to a device for advertising packaged, canned, and other commodities sold in receptacles, although its application is distinctly not limited thereto.

It is, of course, appreciated that the most effective advertising is that which attracts and holds the attention of the prospective purchaser. To accomplish this, resort is generally had to massive devices of an unusual nature. This is particularly necessary in the advertising of products in stores, where the particular commodity in question is usually one among a great many. However, it is, of course, obvious that in a store, where the space is limited and where the proprietor is more interested in sales generally than in the sale of any specific brand of goods carried by him, certain difficulties are encountered in the efforts of the manufacturer to advertise his product. Usually the goods are stored upon open faced shelves, behind counters, or arranged in stacks upon the floor. Under such circumstances it is difficult to cause any one class of goods to stand out above the other goods within the store.

Advertising of products in the stores has usually taken the form of posters, placards, special exhibitions of the product on a counter, and the arrangement of mass displays of the products upon the floors of the store. Such advertising methods are not encouraged by the proprietor of the stores, and, as a matter of fact, in most instances such proprietors are reluctant to cooperate in arranging such advertising because of the space and effort required. And even where this type of advertising is employed, the temporal extent of it is limited. In other words, such displays are usually parts of "advertising programs" which are launched for a specific period within the individual store. The difficulty with such programs is, of course, that upon termination of the program the product is relegated to the class of all other products handled by the merchant, and the producer must rely upon the carry-over value of such programs.

Quite aside from advertising questions, many products are under a severe handicap in that they are contained in opaque containers. In this connection I have in mind particularly canned products and goods that are sold in packages or bags. However, even when the products are put up for sale in glass or other transparent containers the contents do not present a particularly appetizing appearance in the case of foods. This, of course, is dictated by the desire to effect economies in the packaging of commodities, and to general conditions obtaining in mass production. In view of all this, prospective customers are unable to secure a visualization of the articles, and as a consequence the sales of the product suffer accordingly.

One of the objects of my invention is to overcome the above disadvantages.

A further object of my invention is to provide an economical and effective advertising device.

Another object of my invention is to devise a device accurately depicting the actual contents of a receptacle.

A still further object of my invention is to provide an advertising device that effectively attracts the attention of customers, that requires a minimum of space, and which also depicts in an attractive manner the advertised products.

And yet another object of my invention is to devise a novel and effective method of advertising merchandise.

To accomplish the above and other important objects, as will more fully appear hereinafter, my invention in general embraces the idea of providing a display piece which may be arranged in such a way as to catch and hold the attention of a purchaser and which yet may occupy a minimum space. This device may also have incorporated a photograph or other means for depicting the product which is being advertised, and is best arranged in conjunction with the merchandise being advertised.

To insure a more adequate comprehension of my invention, two embodiments thereof are presented in the accompanying drawing, but it is to be distinctly understood that various modifications and alterations may be made therein without departing from the spirit and scope of my invention as set forth in the accompanying claims. In the drawing, in which corresponding numerals indicate the same parts:

Fig. 1 is a plan view of one embodiment of my invention as applied to canned goods, and showing such invention arranged in conjunction with the merchandise being advertised.

Fig. 2 is a side view of a can to which has been affixed my invention.

Fig. 3 is a top plan view of my invention mounted upon a can.

Fig. 4 is a view of a device similar to that shown in Figs. 1 to 3, such device being shown in a flat position.

Fig. 5 is a view of an embodiment of my invention adapted for use with packaged goods, the device being shown in a flat position.

Referring more particularly to Fig. 4, it will be observed that there is disclosed what I term a body member 1 of the device. A variety of substances or materials may be used to form the body member 1, such as, for instance, paper, cardboard, cloth, or metal, although I do not wish to be limited thereto. For purposes of economy and ease of manufacture I prefer that the body member be made up of paper of 150 lb. weight which has proved to be particularly satisfactory. For the reasons that will be pointed out hereinafter the material should have sufficient flexure so that it will assume generally the shape of the can or package which supports it without cracking or creasing. On the other hand, it should have a rigidity to insure that a given flexure of a portion of the display suffices to maintain the remainder in an upright position.

It will be observed that I imprint upon the body member 1, or impose in some other suitable manner, a photographic or other suitable representation of a can and label therefor. As will be noted, the device set forth in Figures 1–4 is for use with canned peas, and the representation on the body portion simulates the actual label employed on the regular cans which are sold to the trade. Of course, if no label is employed on the actual can, the body 1 will represent a blank can. As pointed out elsewhere, my invention may also be used with packages, boxes, bags, or even products sold in bulk. It is also apparent that, while it is particularly effective for advertising foods, other types of merchandise may be advertised by my invention.

Regardless of the receptacle depicted by the body member 1, particular attention is called to the fact that the representation thereon is shown in perspective, or rather in a double perspective. One of these perspectives is vertical, while the other is horizontal. In effecting this perspective showing it will be observed that not only is the printed material shown in perspective, but the entire configuration of the body portion conforms to such perspective view. In other words the upper portion of the body member is of greater width than the lower portion, and the base is curved as at 2, as is also the near edge 3 of the top rim of the represented can. Proper shading 4 is placed upon the representation in order to carry out the perspective view of the can. The exact shading, of course, will be governed by the conditions of any particular display, and will be apparent to the artist preparing the representation.

In elucidation of the variation in width of the body member 1, mentioned above, it will be appreciated that, to an observer viewing an upright can in elevation, the can appears to have a certain height and width. This apparent width is substantially the diameter of the can, but the visible wall of the can comprises substantially a half of its circumference. In this connection I prefer that the body member have a width at some point, preferably about midway between the top and bottom, equalling this visible area of the can wall. If this is so, and with the body member varying in width, it will be noted that the portion of the body member above this midway point will exceed in width the visible area of the can wall, while the lower portion of the member will be less than the visible area of the lower part of the can.

Under normal conditions, therefore, and if the body portion alone were affixed to a can, a portion of the can itself, or its label, would be visible beyond the lower side of the body member. Also the curvature of the base 2 of the body member would permit a view of the can except at its very center. At the same time the upper portion of the body member, if it were snug against the can, would extend to the rear of the line of vision of an observer. Either one of these conditions would materially detract from the effectiveness of my invention. I have provided means, however, to avoid any such disadvantages, as will be pointed out.

At the base of the body member 1 there extend oppositely disposed arms or wings 5, which may be composed of the same material as the body member if the device is to be affixed to a can or other receptacle. The lower edge of such wings are tangential to the center of the base 2 of the body member. The wings 5 are of sufficient length to permit of their extending around the base of the can as shown in Fig. 2 in order to serve as means for securing the complete display to a can. Adhesive material may be affixed to the free ends of the wings, or other means may be provided for the purposes of joining such free ends together at the rear of the can. Of course, under certain conditions the wings need not be of such length if other suitable affixing means are provided.

I find it preferable to have the wings of some neutral color or shade in order that such portion of the wings as may be visible to an observer will simulate a shadow when the device is affixed to a can. Although the width of the wings 5 may be varied according to any particular device, I have found it preferable to keep the width to such a minimum as will effectively secure the device to a can. The reason for maintaining such wings at a minimum will be referred to hereinafter.

However, as stated above, I find it preferable to have some point midway of the height of the body member equal in width to the semi-circumference of the can to which it is attached, or more specifically the visible extent of the can wall. In this connection it is to be noted that, as the wings 5 do not ordinarily extend that high, there would normally result a view of part of the can or its label between the top of the wing and the point just mentioned. In such case I prevent any exposure of the can or its label by providing tapering shoulders 6 which extend from the top of the wing to at least the point below which the can might be viewed. The shoulders 6 should be of substantially the same color and shades as the portion of the wings 5 which are viewable by an observer.

Above the body member, which for the purposes of discussion may be considered as ending with the near edge 3 of the top rim, I provide a portion 7 which I shall term the contents member for ease of description. The contents member carries out the perspective idea of the body member 1, and includes a representation of the contents 8 of the can and the upper part of the far side of the can. The contents member 7 accords with the perspective of the body member to represent compositely an opened can of the commodity in question.

There is shown in the drawing an advertising sign 9 upon which there is imprinted a suitable slogan or notice. This sign, of course, may be omitted, if desired, or may be positioned at some other point of the display.

The form of my invention just described may be attractively presented by securing the display to a can of the product being advertised. In such case the body member 1 is positioned upon the can and the wings 5 are extended around the can, the lower edges resting over the flange or bead 10 at the base of the can, as shown in Fig. 2. The wings should be drawn sufficiently tight about the can to maintain the display in position, and in this connection the flange of the can will tend to positively prevent downward movement of the device.

When so arranged the wings and the lower portion of the body member, as also the shoulders 6, will assume the shape of the can circumference. The upper portion of the body member and the contents portion 7, however, will not assume such a sharp arc as the lower portion of the body member, and will tend slightly to assume a more planilar position. As heretofore stated, it is desirable that the material be not so flexible that the entire device will conform to the shape of the lower part of the body member and thereby set closely upon the can throughout its entire height. On the other hand a material of such rigidity as to prevent a close fit of the lower part of the body member to the can is to be avoided, or a material which might crack or become otherwise damaged upon flexure of the lower part of the body member.

Fig. 3 shows clearly the preferred form of device in which the upper portion is offset or stands away from the circumference of the can 11. Such an arrangement of course results in the top portion of the body member extending beyond the apparent width of the supporting can, and also tends to cast shadows which increase the perspective effect. The imprinted shadows 4 on the body member are thereby augmented by such actual shadows.

While I have found it advantageous to provide for this variation in shape I do not wish to be limited thereto, for the sense of a perspective of the can and its contents may be obtained (although not quite as effectively) even when the top portion of the body member sits snugly against the can the same as the bottom portion. In such case, however, it is preferable to have the top of the body member equal in width to the apparent width of the can. Also it would be preferable to extend the shoulders 6 to the top of the body member.

A snug fit, such as just referred to, might be accomplished in several ways. For instance, the body member might be of such texture that it assumes throughout its entire height the same shape as the lower portion. If even additional means are desired to insure a tight fit at the top, wings similar to the wings 5 may be provided at the top of the body member.

I have found that the effectiveness of my invention is most pronounced when it is employed in conjunction with a row of cans such as shown in Fig. 1. In such figure the regular cans 11 of the product offered for sale are arranged in a row, and my advertising display is arranged upon a can which is positioned between two other cans. This tends to emphasize, by way of contrast, the perspective effect and accentuates the idea of a tilted can with its cover removed. In such an arrangement the advantage of having the upper part of the body member free is particularly apparent. It will be observed that the upper portion of the body member extends slightly beyond the apparent width of the supporting can and, as a matter of fact, obstructs a slight portion of the adjacent cans, as clearly shown in this figure. This, of course, would be the result if a can in the row were actually tilted forward from the position assumed by the row of cans.

Furthermore, the tendency of the upper part of the body portion to assume a planilar position casts shadows not only upon the display device itself as heretofore stated, but also casts shadows upon the adjoining cans. This serves to enhance the idea that the cans are tilted forwardly. It will be appreciated that from a comparatively slight distance an observer would gain the distinct impression that one of the cans in the row actually had its cover removed and was tilted slightly forward.

While I have referred to the advisibility of affixing my display to an actual can, it is, of course, appreciated that this is not essential. The principal purpose of such a can is to afford a support for the display. If desired, my display may be arranged quite independently of any supporting can. In such event, one form that my invention might take would include the reinforcement of wings 5 or making them of sufficiently heavy and rigid material to serve as a support for the body member. The material of the wings should nevertheless be flexible enough to be bent into an annular shape conforming generally to the shape of the can, and provision should be made for securing the free ends together. Again, if it is desired to avoid reinforcement or strengthening of the wings, a short cylinder, having the diameter of a can, might be employed.

It will also be appreciated that while I have referred to the wings extending completely around the periphery of the can, this is by no means essential. They might extend only partially about the can and be provided with means for effecting their adhesion to the can or its label. As a matter of fact, my invention might well be practiced by doing away with the wings altogether, in which event adhesive means should be provided on the body member itself securing either the lower portion of the body, or the entire body member to the can or other receptacle.

While I have referred to the use of my invention in conjunction with canned products, it is by no means limited thereto. For instance, it might be readily employed for the advertising of products that are sold in boxes, packages, or even in bulk. The invention broadly embraces the idea of depicting a receptacle, of any kind whatsoever, shown in perspective and representing a portion of the container broken away in order to afford a view of the contents. In this connection, I do not desire to be limited to a device disclosing the cover removed, for any other method of showing the contents falls within the scope of my invention. For instance, the display might depict a portion of the container wall cut away.

In Figure 5 I have shown a specific form of my invention for use with products that may be packed in a box. In this form of my invention, it will be noted that the body portion 1' is shown in perspective the same as in the case of the body member 1 of Figure 4. In other words, both the imprinted material is shown in perspective, and also the outline of the box itself. Here also, if the display is to be mounted upon an actual box or package, I prefer that the width of the outline at some point intermediate its height equal the width of the box to which it is affixed. But, as pointed out in connection with the display of Figure 4, this is not essential and the width of the display at its top might be equal to the width of the box. In such event, provision should be made, as also pointed out, to prevent any view of the supporting box itself. It is of course, obvious that in the case of both the embodiments shown in Figure 5 and that shown in Figure 4, the width at the bottom of the body member might be the width of the supporting box or the apparent width of the can.

The body member 1' is provided with a contents member 7', which depicts the top portion of the box in perspective together with its contents. This of course varies from the corresponding member of Figs. 1-4, in order to accord with a package. Also in the display of Fig. 5, there are provided wings 5', shoulders 6' and sign 9' for the same purpose as the corresponding members of Figs. 1-4.

Of course, the same considerations apply to the box shown in Fig. 5 as discussed above with reference to the display for use on cans. For instance, the display is preferably affixed to a supporting box at only its base, to permit a slight offset of the display from its support at the top or, if desired, the top of the body member may also be secured to the supporting box. And again, it is not essential that a supporting box be provided, if the wings 5' are suitably reinforced or if other suitable supporting means are provided. I also find that the most effective manner of using the packaged display is by positioning it in a row of actual packages of the goods, as in the case of the canned goods discussed above.

It will be appreciated that I have provided an effective and economical advertising device. As stated, the device may be made of paper of suitable weight, in which case the cost of production may be maintained at a minimum. It will also be noted that this device may be readily arranged for use, and that when once assembled it requires no further attention on the part of the advertiser.

Also it will be appreciated that my invention is adapted for year around use, which is made possible by the fact that it does not require any space in addition to that required by the product being advertised. It may be fixed directly to one of the cans or packages of the product. As heretofore pointed out this is a very real advantage, for it insures its use in every store in which the product is being sold and also its use at all times, rather than during only limited advertising programs. For this reason it is something which all storekeepers will welcome, for it does not interfere with the orderly arrangement of their stores which so rarely is the case with respect to counter, window or floor displays.

Its effectiveness resides in the fact that it immediately attracts the attention of a prospective purchaser, for it conveys the idea that one of the cans or packages out of an entire row is tilted forward and the contents displayed. With a proper depiction of the contents, the purchaser is enabled to see the size, color and general nature of the product being advertised. The perspective view of the can and the shadows which are created as heretofore discussed constitute a very real simulation of a tilted receptacle containing the merchandise being advertised.

It will, of course, be appreciated that my inventive concept is capable of various modifications as to material employed, shape, and arrangement details, presenting numerous possible alternatives. Some of these have been referred to specifically, but I do not wish to be limited thereto. I wish it to be distinctly understood that the scope of my invention is to be determined by merely the appended claims.

I claim:

1. In combination with a suitable support, a device for advertising commodities comprising a body portion depicting in perspective a receptacle for the commodity and the contents thereof, and means for securing the body member to the support so that such member assumes the shape of the receptacle in part, the body portion being composed of such material that those portions of the body portion removed from the securing means incline slightly forward to enhance the perspective impression.

2. In combination with a suitable support, a device for advertising commodities comprising a body portion depicting in perspective a receptacle for the commodity with its top removed to exhibit the contents, means at the base of the body portion to secure it firmly to the support, the support being of the same shape as the commodity receptacle, the body portion being composed of such material that, in cooperation with the securing means, such body portion assumes the shape of the support in part, and in part tilts forwardly therefrom.

3. In combination with a cylindrical support, a device for advertising commodities comprising a body portion depicting in perspective a receptacle for the commodity with its top removed to exhibit the contents, such depiction being of a size to simulate the actual receptacle depicted, and means at the base of the body portion to secure the base firmly to the support, the body portion being composed of such material that the upper part thereof remains offset from the support.

CHARLES L. LOW.